US012776102B2

(12) United States Patent
Graziosi

(10) Patent No.: US 12,776,102 B2
(45) Date of Patent: Oct. 27, 2026

(54) ORTHOATLAS: TEXTURE MAP GENERATION FOR DYNAMIC MESHES USING ORTHOGRAPHIC PROJECTIONS

(71) Applicants: SONY GROUP CORPORATION, Tokyo (JP); Sony Corporation of America, New York, NY (US)

(72) Inventor: Danillo Graziosi, Flagstaff, AZ (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 192 days.

(21) Appl. No.: 18/114,905

(22) Filed: Feb. 27, 2023

(65) Prior Publication Data

US 2024/0127537 A1 Apr. 18, 2024

Related U.S. Application Data

(60) Provisional application No. 63/378,565, filed on Oct. 6, 2022.

(51) Int. Cl.
*G06T 17/20* (2006.01)
*G06T 9/00* (2006.01)
(Continued)

(52) U.S. Cl.
CPC .............. *G06T 17/20* (2013.01); *G06T 15/04* (2013.01); *G06T 9/001* (2013.01); *G06T 15/10* (2013.01)

(58) Field of Classification Search
CPC ......... G06T 17/20; G06T 15/04; G06T 9/001; G06T 15/10
See application file for complete search history.

(56) References Cited

U.S. PATENT DOCUMENTS 5,601,084 A * 2/1997 Sheehan ................ B82Y 15/00 600/416
5,898,793 A * 4/1999 Karron .................... G06T 17/20 382/154

(Continued)

FOREIGN PATENT DOCUMENTS

WO WO-2022023002 A1 2/2022
WO WO-2023144445 A1 8/2023

OTHER PUBLICATIONS

Silva et al, A 3D modeling methodology based on a concavityaware geometric test to create 3D textured coarse models from concept art and orthographic projections , 2018 , Elsevier (Year: 2018).*

(Continued)

*Primary Examiner* — YuJang Tswei
(74) *Attorney, Agent, or Firm* — Haverstock & Owens, A Law Corporation

(57) ABSTRACT

The generation of a texture map using orthographic projections is performed in a fast and efficient manner. A method to generate texture maps taking significantly less time and also allowing maps to exploit the correlation between content of different frames in time is described herein. The texture mapping is able to be used for automatic generation of volumetric content or for more efficient compression of dynamic meshes. The texture map generation described herein includes ways to generate a texture atlas using orthographic projections. A novel stretch metric for orthographic projections is described, and a merging algorithm is devised to optimally cluster triangles into a single patch. Additionally, packing techniques are able to be used for mesh patches that try to optimize size and temporal stability.

18 Claims, 10 Drawing Sheets

(51) Int. Cl.
*G06T 15/04* (2011.01)
*G06T 15/10* (2011.01)

(56) References Cited

U.S. PATENT DOCUMENTS

| | | | | |
|---|---|---|---|---|
| 7,224,356 | B2 * | 5/2007 | Zhou | G06T 17/20 345/419 |
| 2008/0303840 | A1 * | 12/2008 | Zhou | G06T 15/04 345/585 |
| 2011/0025690 | A1 * | 2/2011 | Tzur | G06T 15/10 345/584 |
| 2012/0229445 | A1 * | 9/2012 | Jenkins | G06T 15/405 345/418 |
| 2015/0269770 | A1 * | 9/2015 | Jenkins | G06T 15/20 345/421 |
| 2016/0240001 | A1 * | 8/2016 | Sheffer | G06T 17/20 |
| 2017/0221263 | A1 | 8/2017 | Wei | |
| 2018/0075648 | A1 * | 3/2018 | Moghadam | G01S 17/86 |
| 2019/0087979 | A1 * | 3/2019 | Mammou | H04N 19/597 |
| 2019/0116352 | A1 * | 4/2019 | Pesonen | H04N 19/132 |
| 2020/0294271 | A1 * | 9/2020 | Ilola | G06T 17/20 |
| 2021/0097723 | A1 * | 4/2021 | Kim | H04N 19/567 |
| 2021/0383590 | A1 * | 12/2021 | Roimela | H04N 19/597 |

OTHER PUBLICATIONS

Gunay, Three-dimensional bone geometry reconstruction from X-ray images using hierarchical free-form deformation and non-linear optimization, 2003, CMU (Year: 2003).*

Gieng et al—Constructing Hierarchies for Triangle Meshes—1998—IEEE (Year: 1998).*

Li et al—Rapid three-dimensional surface mesh segmentation based on region dilation—2012—SPIE (Year: 2012).*

Danillo B Graziosi (Sony) et al; "[V-CG] Sony's Dynamic Mesh Coding Call for Proposal Response" ,138. MPEG Meeting; Apr. 25, 2022-Apr. 29, 2022; Online; (Motion Picture Expert Group or ISO/IEC JTC1/SC29/WG11), No. m59284 Apr. 24, 2022 (Apr. 24, 2022), XP030301436.

Patrice Rondao Alface et al; "[V-CG] Nokia's Dynamic Mesh Cording CfP response", 138. MPEG—Meeting; Apr. 25, 2022-Apr. 29, 2022; Online; (Motion Picture Expert Group or ISO/IEC JTC1/SC29/WG11), No. m59274 Apr. 22, 2022 (Apr. 22, 2022), XP030301418.

* cited by examiner

Neigh(V = $\{T_1 .. T_{15}\}$
Neigh(E) = $\{T_4, T_{10}, T_{14}\}$

ORTHOATLAS: TEXTURE MAP GENERATION FOR DYNAMIC MESHES USING ORTHOGRAPHIC PROJECTIONS

CROSS-REFERENCE TO RELATED APPLICATION(S)

This application claims priority under 35 U.S.C. § 119(e) of the U.S. Provisional Patent Application Ser. No. 63/378,565, filed Oct. 6, 2022 and titled, "ORTHOATLAS: TEXTURE MAP GENERATION FOR DYNAMIC MESHES USING ORTHOGRAPHIC PROJECTIONS," which is hereby incorporated by reference in its entirety for all purposes.

FIELD OF THE INVENTION

The present invention relates to three dimensional graphics. More specifically, the present invention relates to generating texture maps using orthographic projections.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

UVAtlas from Microsoft is the state-of-the-art automatic texture map generation, but requires a significant amount of time, and does optimization for a local frame only. V-PCC generates patches using orthographic projections, but targets point clouds only, so it does not address patch generation for meshes.

SUMMARY OF THE INVENTION

The generation of a texture map using orthographic projections is performed in a fast and efficient manner. A method to generate texture maps taking significantly less time and also allowing maps to exploit the correlation between content of different frames in time is described herein. The texture mapping is able to be used for automatic generation of volumetric content or for more efficient compression of dynamic meshes. The texture map generation described herein includes ways to generate a texture atlas using orthographic projections. A novel stretch metric for orthographic projections is described, and a merging algorithm is devised to optimally cluster triangles into a single patch. Additionally, packing techniques are able to be used for mesh patches that try to optimize size and temporal stability.

In one aspect, a method programmed in a non-transitory memory of a device comprises generating patches from dynamic mesh information and packing the patches on a texture atlas using orthographic projections. Generating the patches from dynamic mesh information further comprises: generating a list of adjacent triangles, calculating triangle properties, adding neighboring triangles, checking for vertex occlusion and checking for surface occlusion. Generating the list of adjacent triangles comprises adding triangles that share a vertex with a triangle to the list. Generating the list of adjacent triangles comprises adding triangles that share an edge with a triangle to the list. Calculating the triangle properties comprises calculating a normal and a surface area of each triangle. The method further comprises selecting a seed triangle whose normal is most aligned with a most frequent orientation that has not been added to a patch. The method further comprises merging the patches based on a calculated cost, wherein the calculated cost is based on a perimeter of the patches and an ortho stretch value. Packing the patches on the texture atlas using orthographic projections comprises implementing frame scaling, patch orientation and temporal stabilization.

In another aspect, an apparatus comprises a non-transitory memory for storing an application, the application for: generating patches from dynamic mesh information and packing the patches on a texture atlas using orthographic projections and a processor coupled to the memory, the processor configured for processing the application. Generating the patches from dynamic mesh information further comprises: generating a list of adjacent triangles, calculating triangle properties, adding neighboring triangles, checking for vertex occlusion and checking for surface occlusion. Generating the list of adjacent triangles comprises adding triangles that share a vertex with a triangle to the list. Generating the list of adjacent triangles comprises adding triangles that share an edge with a triangle to the list. Calculating the triangle properties comprises calculating a normal and a surface area of each triangle. The application is further configured for selecting a seed triangle whose normal is most aligned with a most frequent orientation that has not been added to a patch. The application is further configured for merging the patches based on a calculated cost, wherein the calculated cost is based on a perimeter of the patches and an ortho stretch value. Packing the patches on the texture atlas using orthographic projections comprises implementing frame scaling, patch orientation and temporal stabilization.

In another aspect, a system comprises one or more cameras for acquiring three dimensional content and an encoder configured for: generating patches from dynamic mesh information and packing the patches on a texture atlas using orthographic projections. Generating the patches from dynamic mesh information further comprises: generating a list of adjacent triangles, calculating triangle properties, adding neighboring triangles, checking for vertex occlusion and checking for surface occlusion. Generating the list of adjacent triangles comprises adding triangles that share a vertex with a triangle to the list. Generating the list of adjacent triangles comprises adding triangles that share an edge with a triangle to the list. Calculating the triangle properties comprises calculating a normal and a surface area of each triangle. The encoder is further configured for selecting a seed triangle whose normal is most aligned with a most frequent orientation that has not been added to a patch. The encoder is further configured for merging the patches based on a calculated cost, wherein the calculated cost is based on a perimeter of the patches and an ortho stretch value. Packing the patches on the texture atlas using orthographic projections comprises implementing frame scaling, patch orientation and temporal stabilization.

DETAILED DESCRIPTION OF THE PREFERRED EMBODIMENT

Meshes are composed of a set of polygons usually describing a surface of a volume. An efficient way to describe the surface properties of a mesh (for instance, its color characteristics) is to generate a texture atlas that maps the properties of the 3D surface onto a 2D surface. However, mapping 3D surfaces onto 2D is a non-trivial problem, and state-of-the-art methods such as UVAtlas from Microsoft resorts to time consuming optimizations to find appropriate cuts in the mesh and mapping using surface harmonics. In the latest international point cloud compression standard, texture map images are being generated for point clouds using orthographic projections. While the texture map images are easy to generate, the texture map images are used for point clouds only, so they do not consider the connectivity structure present in meshes. A method described herein is able to generate texture images for meshes that uses orthographic projections, similar to what is used in the V-PCC standard. The texture mapping is able to be used for automatic generation of volumetric content or is able to be used for more efficient compression of dynamic meshes.

The texture map generation described herein includes ways to generate a texture atlas using orthographic projections. A novel stretch metric for orthographic projections is described, and a merging algorithm is devised to optimally cluster triangles into a single patch. Additionally, packing techniques are able to be used for mesh patches that try to optimize size and temporal stability.

Texture map generation using orthographic projections includes patch generation and patch packing. Patch generation includes seed selection using connected components (e.g., triangles that share an edge/vertices); orthoStretch: a projections distortion measurement for orthographic projections; and a rate-distortion based merge algorithm using orthoStretch and patch perimeter. Patch packing includes: frame/patch scaling, patch rotation, and temporal alignment.

Figure 1:
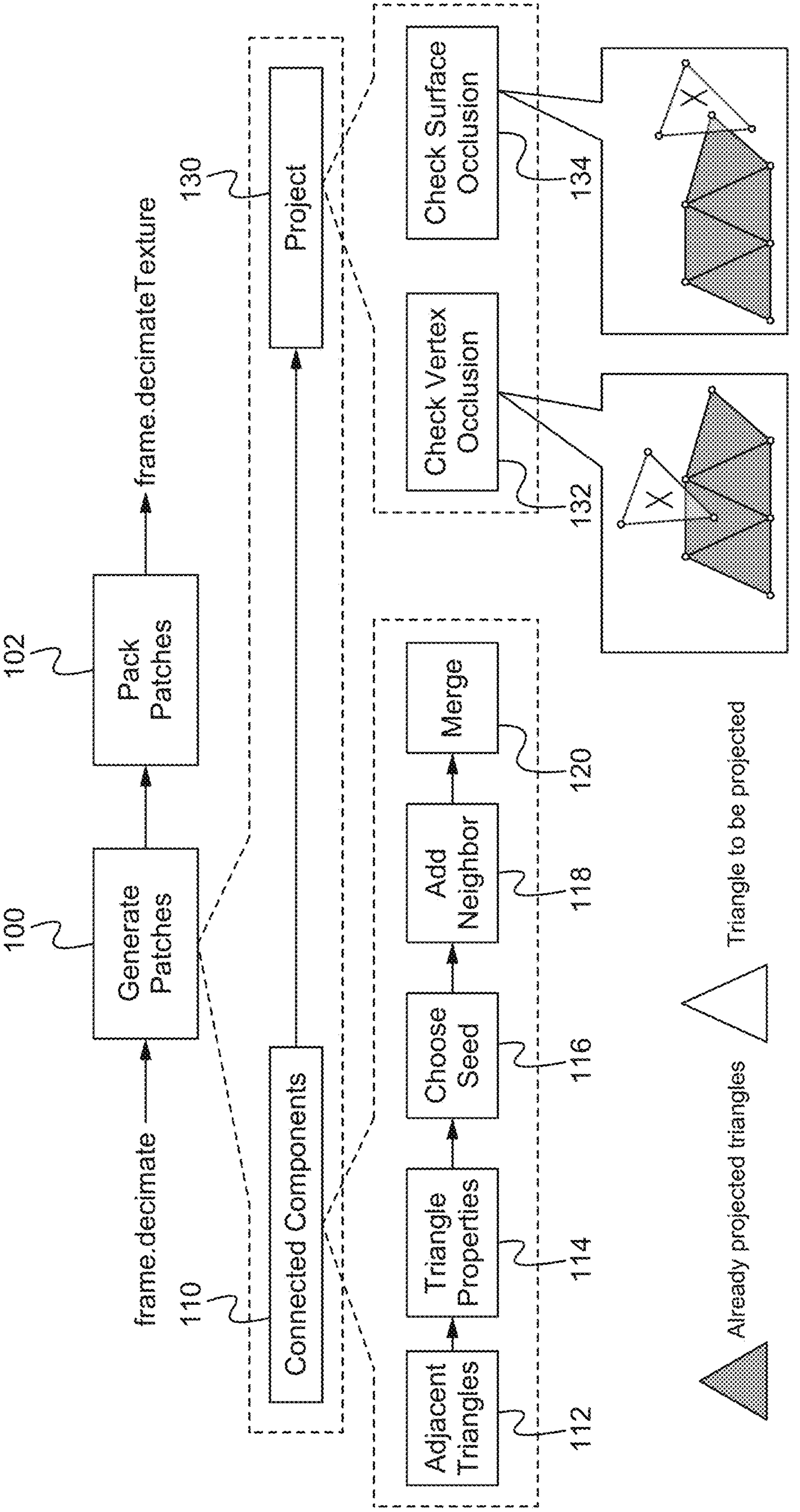
FIG. 1 illustrates a diagram of texture parameterization according to some embodiments.

FIG. 1 illustrates a diagram of texture parameterization according to some embodiments. In the step 100, patches are generated. After the patches are generated, the patches are packed, in the step 102. For example, the patches are packed on a texture atlas.

Generating the patches includes generating connected components in the step 110, and projection, in the step 130.

Generating the connected components includes: generating a list of adjacent triangles, in the step 112; for each triangle, triangle properties are calculated, in the step 114; a seed (triangle) is chosen, in the step 116; neighbors are added from adjacent triangles depending on criteria, in the step 118; after looking at all of the adjacent triangles, if there are any triangles that cannot be added to the patch, the process resumes with a different seed (triangle), in the step 116; and when there are no remaining triangles, then the patches are merged to generate big surfaces of connected triangles, in the step 120. Projection is the performed which includes: checking for vertex occlusion, in the step 132, and checking for surface occlusion, in the step 134. If there is any vertex occlusion or surface occlusion, then the triangle is removed from the patch and included with a different patch.

Figure 2:
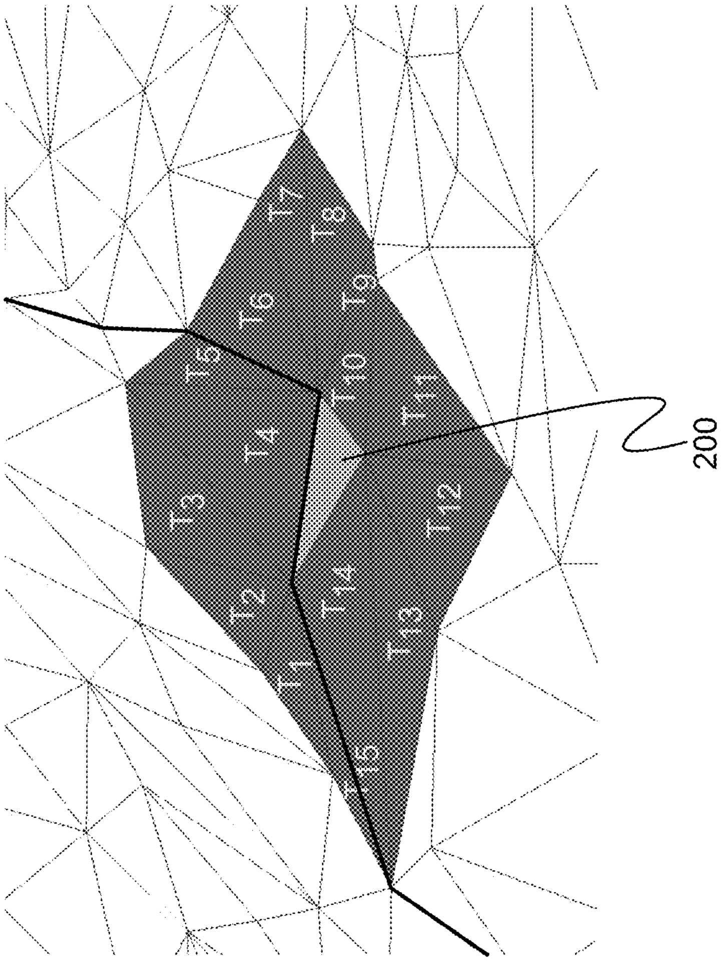
FIG. 2 illustrates a diagram of adjacent triangle analysis according to some embodiments.

FIG. 2 illustrates a diagram of adjacent triangle analysis according to some embodiments. Triangle 200 has many triangles that are adjacent and neighboring. A triangle neighborhood is able to be defined by sharing a single vertex (params.useVertexCriteria=true) or sharing an edge (params.useVertexCriteria=false). Adjacent triangles are those triangles that share at least one vertex with the specified triangle. For example, Triangles 1-15 $\{T_1, \ldots, T_{15}\}$ all share a vertex with Triangle 200. Neighboring triangles share an edge with a triangle. For example, Triangles 4, 10 and 14 $\{T_4, T_{10}$ and $T_{14}\}$ share an edge with Triangle 200. Lists of adjacent triangles and neighboring triangles are able to be kept for each triangle. A flag is also able to be included to preserve boundaries.

Figure 3:
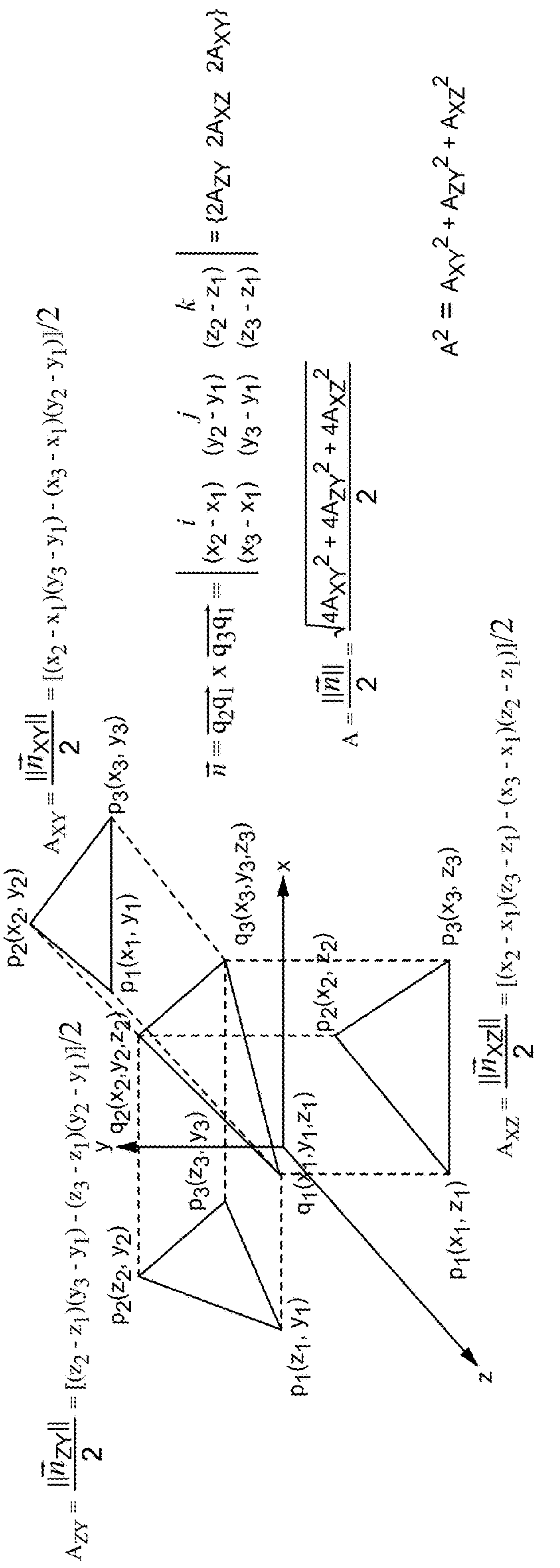
FIG. 3 illustrates a diagram of calculating triangle properties according to some embodiments.

FIG. 3 illustrates a diagram of calculating triangle properties according to some embodiments. For each triangle, some properties are calculated (e.g., the normal and surface area in 3D). The triangle's surface area and normal are able to be derived from the projected areas.

Figure 4:
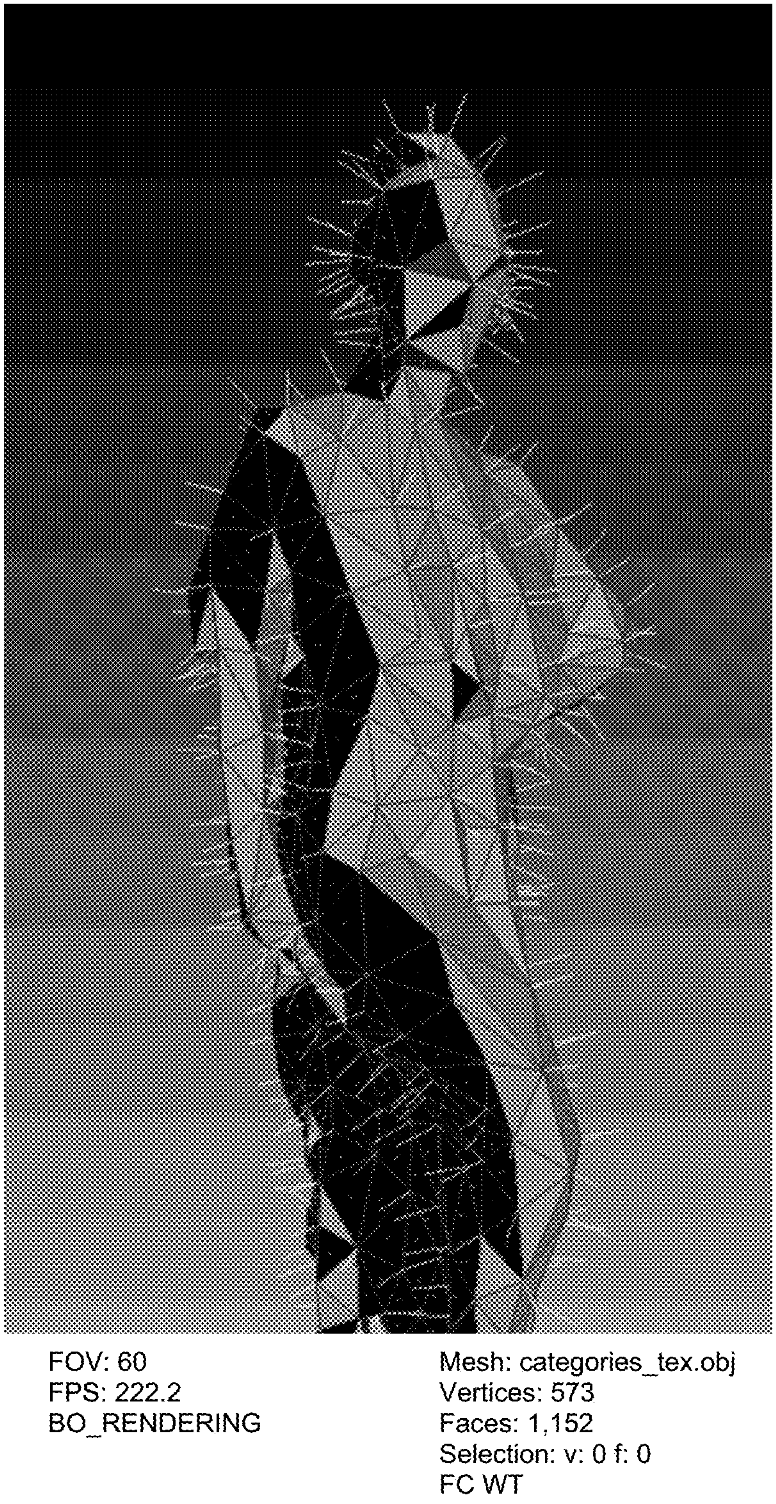
FIG. 4 illustrates a diagram of choosing a seed according to some embodiments.

FIG. 4 illustrates a diagram of choosing a seed according to some embodiments. The most frequent orientation is obtained by checking the triangle's categories' histogram. If params.bUseSeedHistogram=true, the seed is the triangle whose normal is most aligned with the most frequent orientation and has not been added to a connected component. If params.bUseSeedHistogram=false, the seed is the first available triangle (e.g., not in a connected component yet).

To add neighboring triangles to a list, the following criteria is checked: if the triangle's category is the same as the connected component orientation; if the angle between the last inserted normal and the current normal is smaller than a certain threshold; if the area of the patch is smaller than a fraction of the total area; and if the number of triangles is smaller than a threshold. In some embodiments, a neighboring triangle is only added to the list if all of the above criteria are true.

Figure 5:
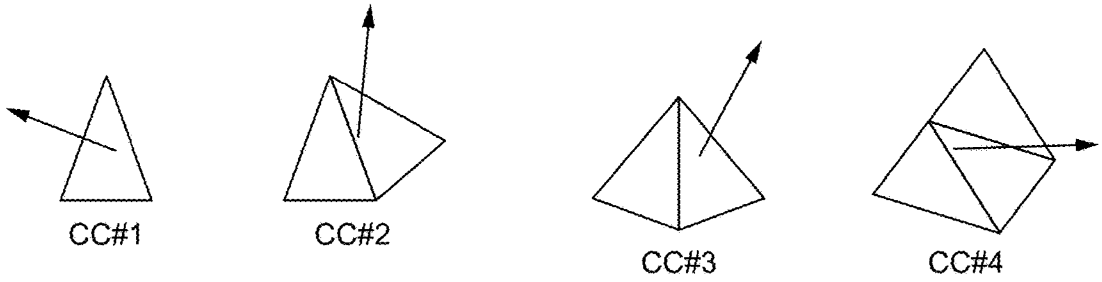
FIG. 5 shows a diagram of different sets of connected components according to some embodiments.

FIG. 5 shows a diagram of different sets of connected components according to some embodiments.

A merge function merges neighboring connected components depending on the cost, based on the perimeter of the connected components and ortho stretch (e.g., the stretch caused by orthographic projection). The merge algorithm starts by generating an ordered list of connected components. The list is ordered by 1) smallest number of triangles, and 2) average normal (weighted by the triangle area) most aligned with the orientation. Each connected component starts with a cost: $COST(M_i)=L^2(M_i)+\lambda PERIMETER(M_i)$, wherein $M_i$ is the connected component; L is the rate distortion; and λ is a parameter to provide weight between the rate distortion and the perimeter. If λ is 0, then the perimeter is not considered in the cost, and if the λ is a very high value, then only the perimeter is considered in the cost, and the rate distortion is irrelevant. Furthering the example, if very few bits are available, then distortion is not as important, and a very large value is used for λ. If quality is very important, then λ is 0 or very small, and to minimize the cost, the distortion is minimized.

While the list is not empty, the following steps are performed:

- the top element of the list ($M_i$) is removed);
- the list of candidate neighbors ($\{M_j\}$, $j\in\aleph_i$ is obtained, where $\aleph_i$ is the list of connected components that share an edge/vertex with $M_i$);
- for each neighboring candidate:
  - calculating the merging cost: $COST(M_i+M_j)=L^2(M_i+M_j)+\lambda PERIMETER(M_i)$;
  - if the merge operation with one of the neighbors (connected components that share at least one edge) reduces the cost: $(COST(M_i+M_j)<COST(M_i)+COST(M_j)$, then selecting the neighbor that minimizes the joint cost:

$$\min_{j\in\aleph_i} COST\ (M_i+M_j);$$

- if a neighbor was selected for merge, updating the connected component ($M_i \rightarrow M_j$) and resorting the list.

Figure 6:
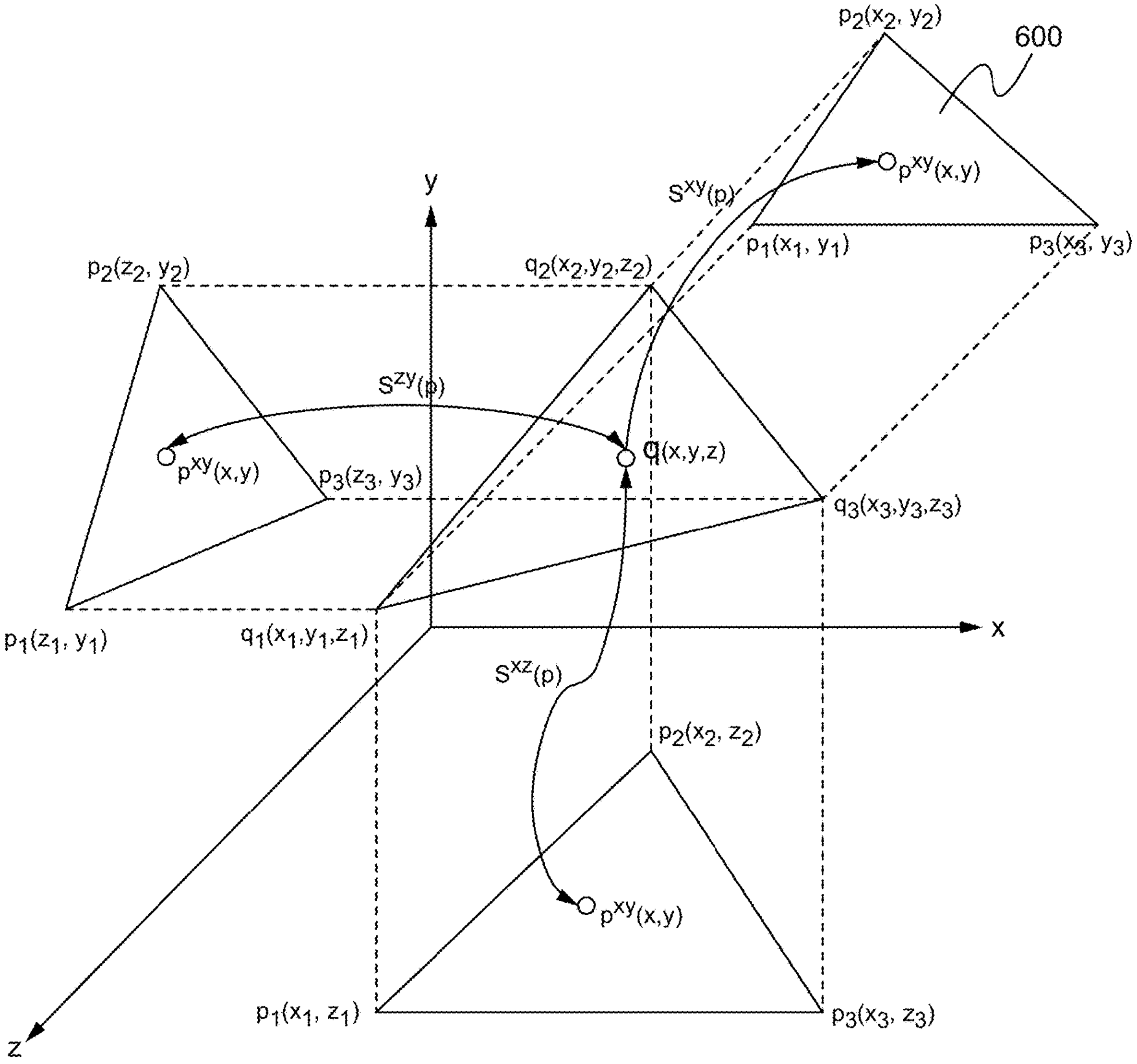
FIG. 6 illustrates a diagram of performing ortho stretch according to some embodiments.

FIG. 6 illustrates a diagram of performing ortho stretch according to some embodiments. Described herein is a function that maps a point in 3D space to 2D space (e.g., a projection function). What connects the point in 3D space to the point in 2D space is a barycentric interpolation. Barycentric interpolation involves using area of projected triangles to generate weights and then derive any point on the surface using the weights. This is able to be performed in any direction (e.g., x, y, z) For example, triangles are able to be generated inside the triangle 600 (and the other triangles) by connecting the vertices to the point p, and then the value of the point p in 3D space is able to be obtained by interpolation of the area of those triangles in the projected space. The value q is able to be obtained using the points at the vertices, $q_1$, $q_2$, $q_3$, by weighting them using the area of the projected triangles. By solving the below equations, a ratio between the areas is found to re-generate the point in 3D space based on the projection in 2D space.

$$S^{XY}(p)=q$$

$$S^{XY}(p)=\frac{(\langle p,p_2,p_3\rangle q_1+\langle p,p_3,p_2\rangle q_2+\langle p,p_1,p_2\rangle q_3)}{\langle p_1,p_2,p_3\rangle}$$

$$\text{where:}\quad \begin{aligned}\langle p,p_2,p_3\rangle&=[(x_2-x)(y_3-y)-(x_3-x)(y_2-y)]/2\\ \langle p,p_3,p_2\rangle&=[(x_3-x)(y_2-y)-(x_2-x)(y_3-y)]/2\\ \langle p,p_1,p_2\rangle&=[(x_1-x)(y_2-y)-(x_2-x)(y_1-y)]/2\end{aligned}$$

$$S^{XY}(p)=\left\{x \quad y \quad x\frac{A_{ZY}}{A_{XY}}+y\frac{A_{XZ}}{A_{XY}}+\frac{\det\left(\begin{bmatrix}q_1\\q_2\\q_3\end{bmatrix}\right)}{A_{XY}}\right\}$$

$$S^{ZY}(p)=\left\{y\frac{A_{XZ}}{A_{ZY}}+z\frac{A_{XY}}{A_{ZY}}+\frac{\det\left(\begin{bmatrix}q_1\\q_2\\q_3\end{bmatrix}\right)}{A_{ZY}} \quad y \quad z\right\}$$

$$S^{XZ}(p)=\left\{x \quad x\frac{A_{ZY}}{A_{XZ}}+z\frac{A_{XY}}{A_{XZ}}+\frac{\det\left(\begin{bmatrix}q_1\\q_2\\q_3\end{bmatrix}\right)}{A_{XZ}} \quad z\right\}$$

Given the above, it is possible to get the Jacobian of the function. By decomposing the Jacobian into the eigenvalues and eigenvectors, the stretch (e.g., size reduction of triangle from 3D space to 2D space) is able to be determined. The stretch is a ratio between the areas in 3D space and 2D space. In some embodiments, the areas are precalculated, so that the stretch is able to be calculated preemptively or quickly.

$$\text{Jacobian}=\left[\frac{\partial S^{XY}}{\partial x} \quad \frac{\partial S^{XY}}{\partial y}\right]$$

$$\frac{\partial S^{XY}}{\partial x}=\left\{1 \quad 0 \quad \frac{A_{ZY}}{A_{XY}}\right\} \quad \frac{\partial S^{XY}}{\partial y}=\left\{0 \quad 1 \quad \frac{A_{XZ}}{A_{XY}}\right\}$$

largest (Γ) and smallest (Y) singular values:

$$\Gamma=\sqrt{\frac{(a+c)}{2}+\sqrt{(a-c)^2+4b}} \quad Y=\sqrt{\frac{(a+c)}{2}-\sqrt{(a-c)^2+4b}}$$

where:

$$a=\frac{\partial S^{XY}}{\partial x}\frac{\partial S^{XY}}{\partial x} \quad b=\frac{\partial S^{XY}}{\partial x}\frac{\partial S^{XY}}{\partial y} \quad c=\frac{\partial S^{XY}}{\partial y}\frac{\partial S^{XY}}{\partial y}$$

-continued $$a = 1 + \left(\frac{A_{ZY}}{A_{XY}}\right)^2 \quad b = \frac{A_{ZY}A_{XZ}}{A_{XY}^2} \quad c = 1 + \left(\frac{A_{XZ}}{A_{XY}}\right)^2$$

triangle stretch $L^2_{XY}$, $L^2_{XZ}$, $L^2_{ZY}$:

$$L_{XY}^2(T) = \sqrt{\Gamma^2 + Y^2} = \sqrt{\frac{(a+c)}{2}} = \sqrt{\frac{1}{2} + \frac{1}{2}\left(\frac{A}{A_{XY}}\right)^2}$$

$$L_{XZ}^2(T) = \sqrt{\frac{1}{2} + \frac{1}{2}\left(\frac{A}{A_{XZ}}\right)^2}$$

$$L_{ZY}^2(T) = \sqrt{\frac{1}{2} + \frac{1}{2}\left(\frac{A}{A_{ZY}}\right)^2}$$

mesh $L^2$ stretch:

$$L^2(M) = \sqrt{\sum_{T_i \in M} \left(L^{P^2}(T_i)\right)^2 A(T_i) / \sum_{T_i \in M} A(T_i)} = \sqrt{\frac{1}{2} + \frac{1}{2} \frac{\sum_{T_i \in M} \left(\frac{A}{A_P}\right)^2 A(T_i)}{\sum_{T_i \in M} A(T_i)}}$$

where $L^{P^2}(T_i) = L^{XY^2}(T_i)$ or $L^{XZ^2}(T_i)$ or $L^{ZY^2}(T_i)$.

Figure 7:
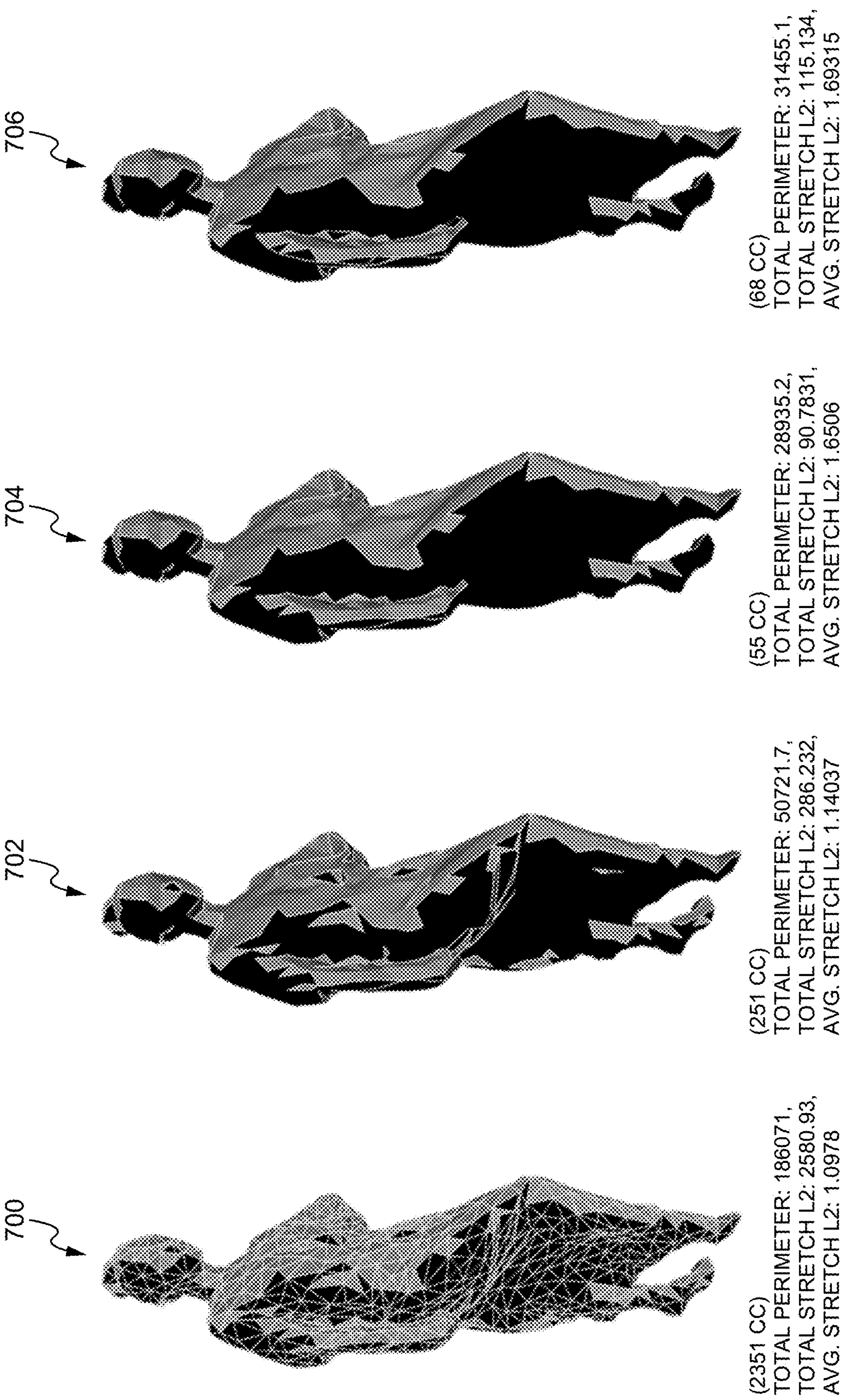
FIG. 7 illustrates results of ortho stretch according to some embodiments.

FIG. 7 illustrates results of ortho stretch according to some embodiments. In an original mesh 700, there are 2351 connected components (e.g., individual triangles initially), the perimeter is 186071, and the stretch is 1.0978. In the mesh 702, clustering with neighbors is performed (without additional analysis), so now there are 251 connected components, and the perimeter is down to 50721.7; however, the stretch went up slightly to 1.14037. In the mesh 704, merging is also implemented, so there are 55 connected components with a perimeter of 28935.2, but a stretch of 1.6506. With 55 connected components, there are many fewer bits needed. In the mesh 706, projection analysis is performed (e.g., avoid connected components on top of each other), which results in 68 connected components, a perimeter of 31455.1, and a stretch of 1.69315. With the projection, the texture coordinates are able to be determined by the projection information.

Figure 8:
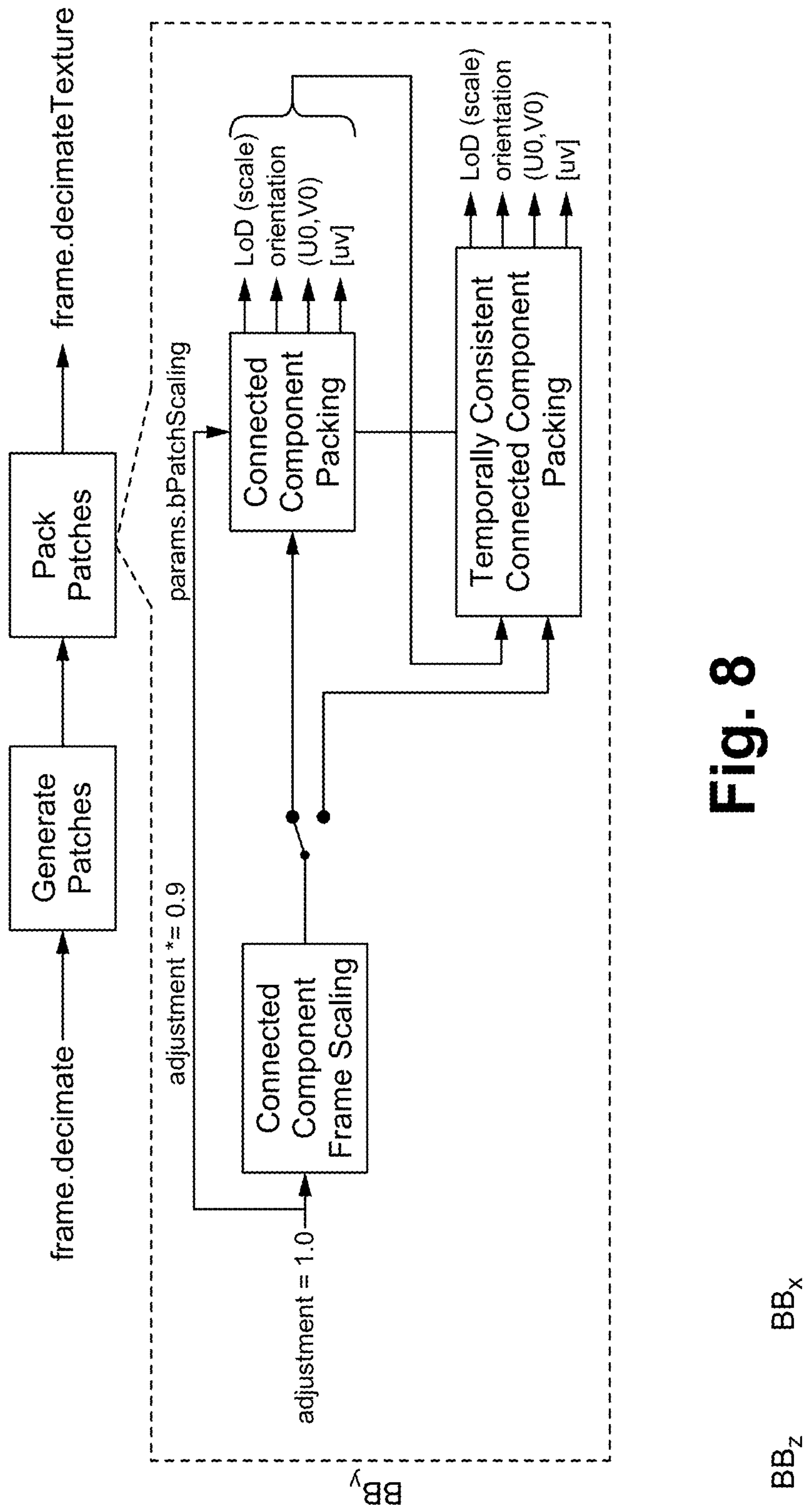
FIG. 8 illustrates a diagram of packing according to some embodiments.

FIG. 8 illustrates a diagram of packing according to some embodiments. After the patches (e.g., connected components) are generated, the patches are placed on the 2D image in the video, and then the video is encoded. The patches are scaled (e.g., frame scaling) to fit on the surface. For each patch, patch scaling is implemented.

Figure 9:
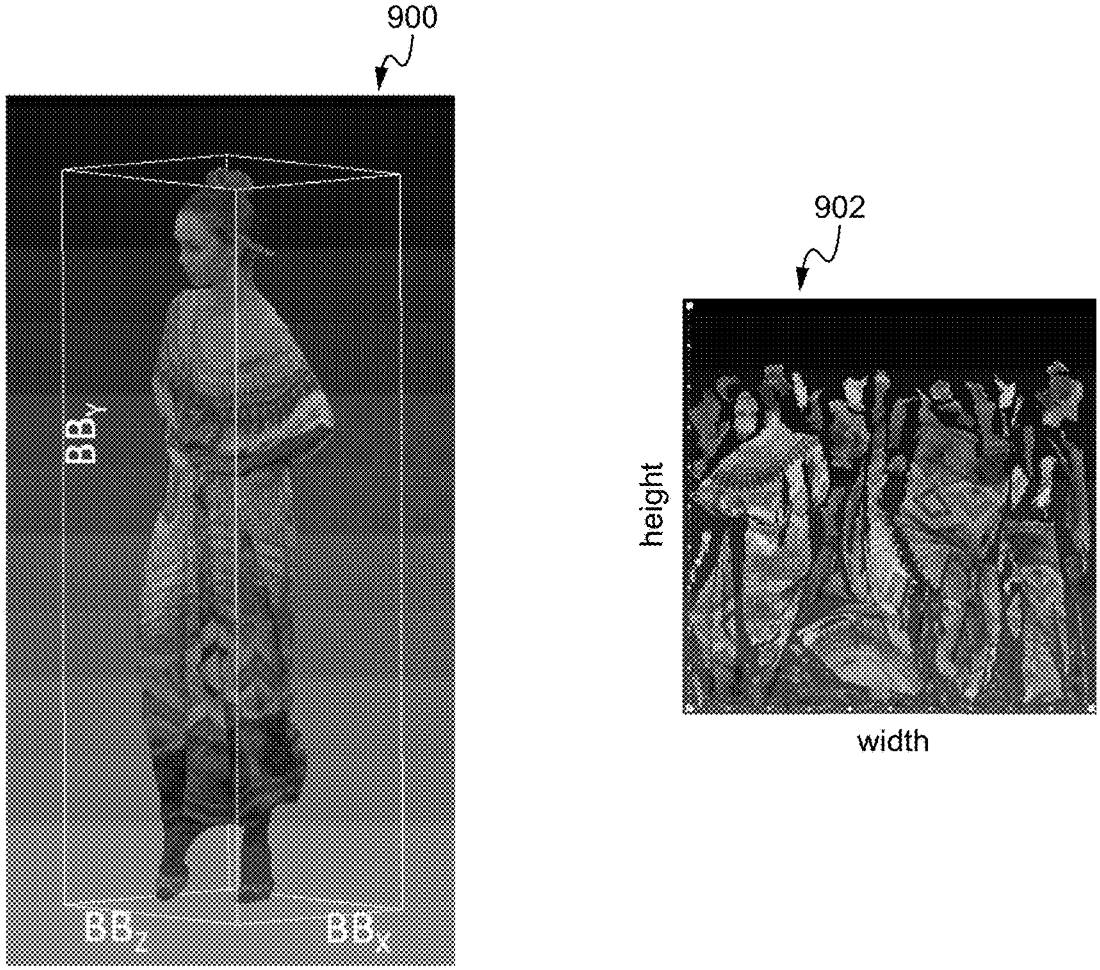
FIG. 9 illustrates images of frame scaling according to some embodiments.

FIG. 9 illustrates images of frame scaling according to some embodiments. Initial scaling is used to generate projections that occupy most of the texture map surface. For example, with a 2K by 2K surface, the patches are adjusted to occupy the surface the most efficient way possible. The sizes of the patches are maximized to occupy the entire surface. If packing is not successful, the scaling is reduced by 10% (or another value) to provide more space for the projected connected components.

$$\text{frame scale} = \text{adjustment} * \frac{\text{height}}{occRes * \left\lceil \frac{\max(BB_X, BB_Y, BB_Z)}{occRes} \right\rceil},$$

where adjustment is the scaling value (e.g., 10%), BB are dimensions of the bounding box 900, height is the height of the texture map 902, and occRes is occupancy resolution. The occupancy resolution is a resolution of blocks of 16×16 (or another size) instead of pixel by pixel.

In the exemplary image, BBy is the largest dimension, so the height of the texture map is set close to or the same as the height of BBy. However, sometimes the patches are too big to fit in the texture map. When the patches are too big, then every patch is scaled down by 10%. If the scaled patches still do not fit in the texture map, then the patches are scaled down by another 10%, and the process loops until the patches fit the texture map.

For each patch, the patch scale, orientation and position are able to be adjusted. Patch scaling is able to be performed in addition to the frame scaling to adapt the texture size on a per-patch basis. Patch scaling enables for specific areas with greater details (e.g., face) to use more texture space. In an exemplary implementation, if params.bPatchScaling=true, then the initial size of the patch is doubled (or increased by another amount). If the patch cannot be packed, then its size is reduced by 10%. If the total size reduction surpasses 50% of the size of the patch, then the packing is deemed to have failed, and a new frame scaling is calculated.

Figure 10:
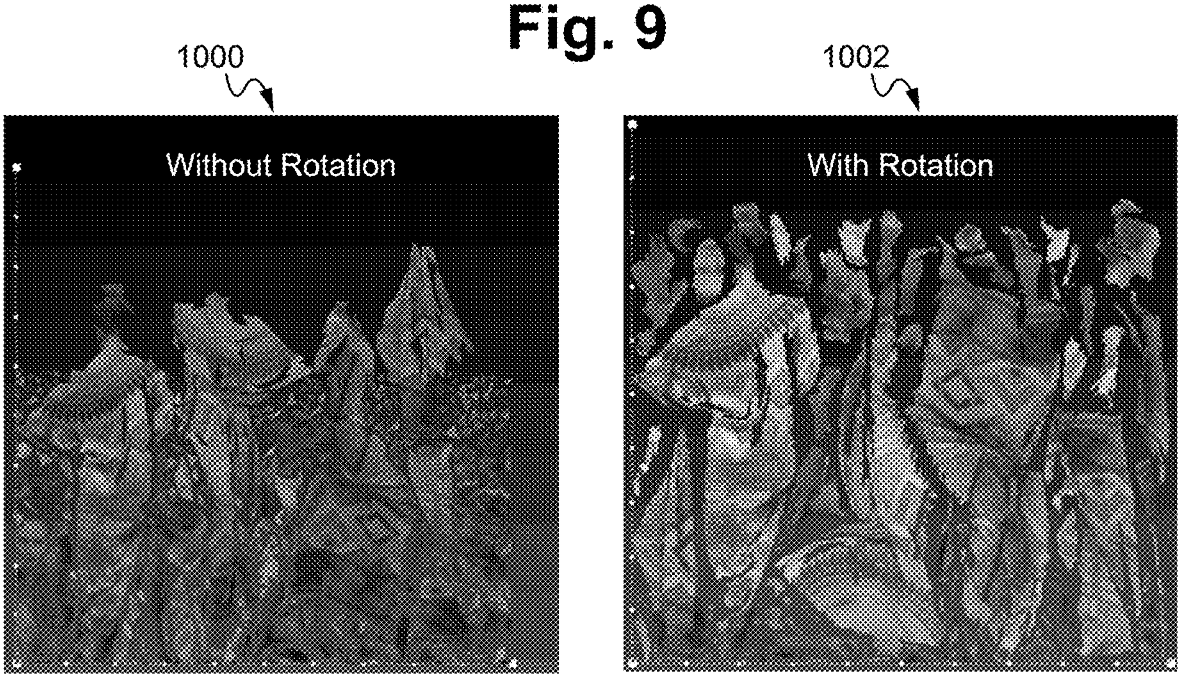
FIG. 10 illustrates images of patch orientation according to some embodiments.

FIG. 10 illustrates images of patch orientation according to some embodiments. Similar to V-PCC, patches are able to rotate in the texture atlas domain to obtain a better fit. However, in some embodiments, in order to maintain the winding of the triangles, only 0°, 90°, 180° and 270° rotations are allowed. For example, image 1000 shows the unrotated patches in the texture map, and image 1002 shows rotated patches.

Figure 11:
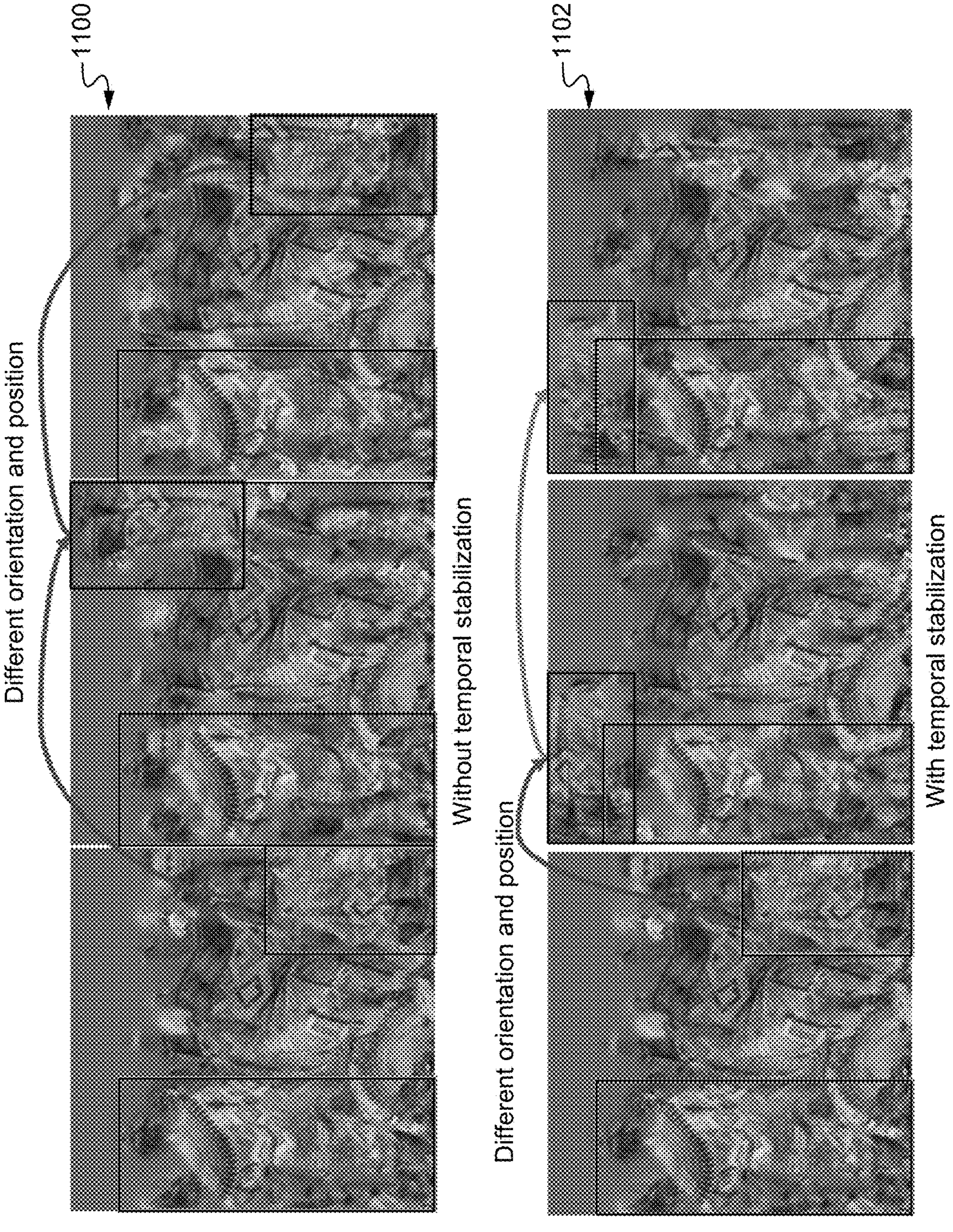
FIG. 11 illustrates images of temporal stabilization according to some embodiments.

FIG. 11 illustrates images of temporal stabilization according to some embodiments. Matching patches are determined by checking the projection direction and the ratio between the volume of the intersection of both patches in 3D, and the volume of the union of both patches in 3D. The matched patches will have the same position (U0, V0), same orientation (O) and same scale (S) as the matched patches. Image 1100 shows the texture maps without temporal stabilization, and image 1102 shows the texture maps with temporal stabilization.

The texture map coordinates may be derived by applying the following transforms:

$$\begin{bmatrix} u^* \\ v^* \end{bmatrix} = W + P * \begin{bmatrix} X - BB^{min}(x) \\ X - BB^{min}(y) \\ X - BB^{min}(z) \end{bmatrix}$$

where:

$$P(0) = \begin{bmatrix} 0 & 0 & -1 \\ 0 & 1 & 0 \end{bmatrix}, P(1) = \begin{bmatrix} 0 & 0 & 1 \\ 1 & 0 & 0 \end{bmatrix}, P(2) = \begin{bmatrix} 1 & 0 & 0 \\ 0 & 1 & 0 \end{bmatrix},$$

$$P(3) = \begin{bmatrix} 0 & 0 & 1 \\ 0 & 1 & 0 \end{bmatrix}, P(4) = \begin{bmatrix} 0 & 0 & -1 \\ 1 & 0 & 0 \end{bmatrix}, P(5) = \begin{bmatrix} -1 & 0 & 0 \\ 0 & 1 & 0 \end{bmatrix}$$

$$W(0) = \begin{bmatrix} BB^{max} - BB^{min}(z) \\ 0 \end{bmatrix}, W(1) = \begin{bmatrix} 0 \\ 0 \end{bmatrix}, W(2) = \begin{bmatrix} 0 \\ 0 \end{bmatrix}, W(3) = \begin{bmatrix} 0 \\ 0 \end{bmatrix},$$

$$W(4) = \begin{bmatrix} BB^{max} - BB^{min}(z) \\ 0 \end{bmatrix}, W(5) = \begin{bmatrix} BB^{max} - BB^{min}(x) \\ 0 \end{bmatrix},$$

$$\begin{bmatrix} u \\ v \end{bmatrix} = \begin{bmatrix} 1/(occRes * \text{width}) & 0 \\ 0 & 1/(occRes * \text{height}) \end{bmatrix}$$

$$\left(\begin{bmatrix} U_0 * occRes \\ V_0 * occRes \end{bmatrix} + O + R * \begin{bmatrix} LoD & 0 \\ 0 & LoD \end{bmatrix} \begin{bmatrix} u^* \\ v^* \end{bmatrix}\right)$$

-continued where:

$$O(0°)=\begin{bmatrix}0\\0\end{bmatrix},\ O(90°)=\begin{bmatrix}\text{height } OccCC*occRes\\0\end{bmatrix},$$

$$O(180°)=\begin{bmatrix}\text{width } OccCC*occRes\\\text{height } OccCC*occRes\end{bmatrix},\ O(270°)=\begin{bmatrix}0\\\text{width } OccCC*occRes\end{bmatrix}$$

$$R(0°)=\begin{bmatrix}1&0\\0&1\end{bmatrix},\ R(90°)=\begin{bmatrix}0&-1\\1&0\end{bmatrix},$$

$$R(180°)=\begin{bmatrix}-1&0\\0&-1\end{bmatrix},\ R(270°)=\begin{bmatrix}0&1\\-1&0\end{bmatrix}.$$

Figure 12:
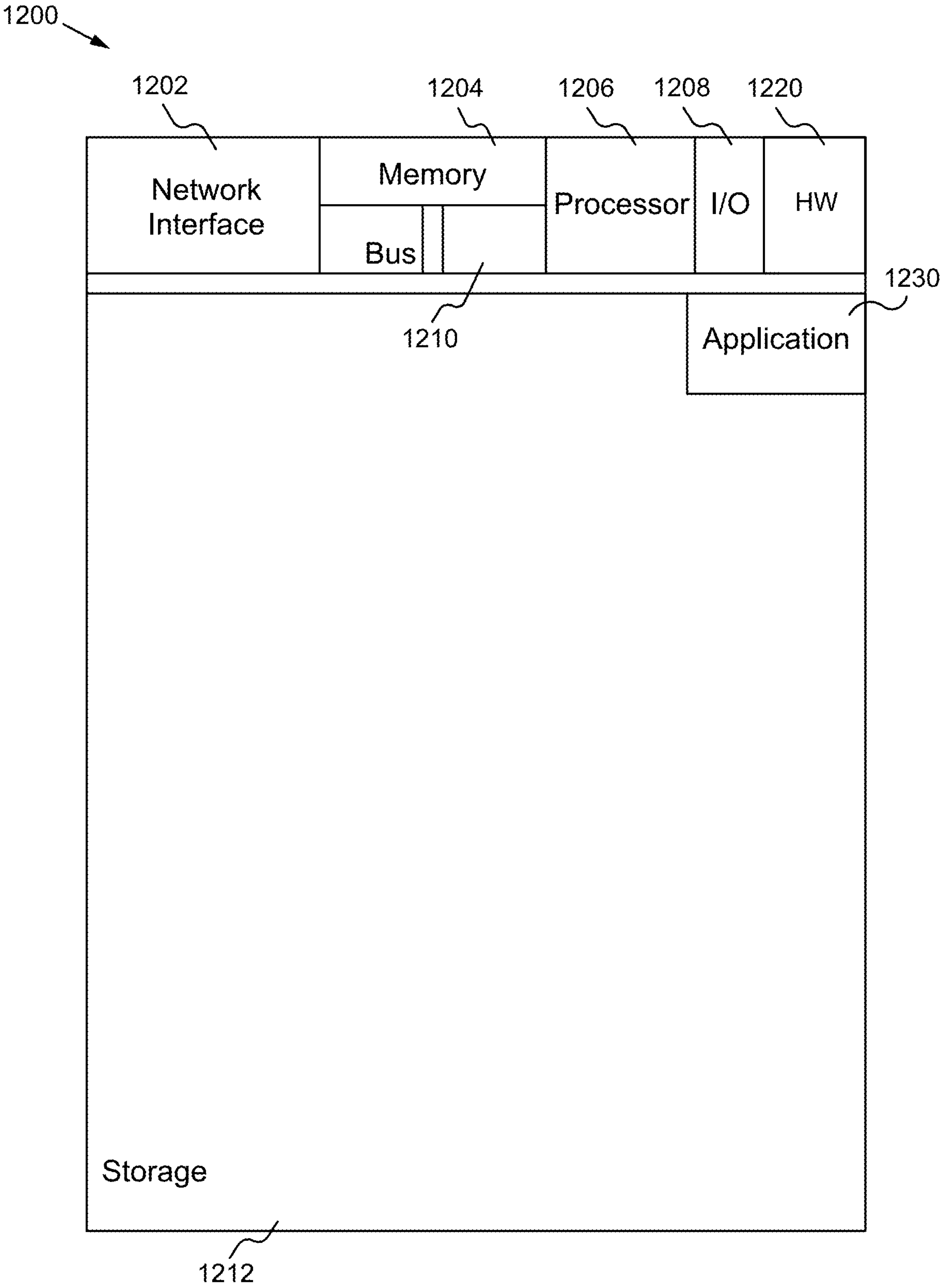
FIG. 12 illustrates a block diagram of an exemplary computing device configured to implement the texture map generation using orthographic projections method according to some embodiments.

FIG. 12 illustrates a block diagram of an exemplary computing device configured to implement the texture map generation using orthographic projections method according to some embodiments. The computing device 1200 is able to be used to acquire, store, compute, process, communicate and/or display information such as images and videos including 3D content. The computing device 1200 is able to implement any of the encoding/decoding aspects. In general, a hardware structure suitable for implementing the computing device 1200 includes a network interface 1202, a memory 1204, a processor 1206, I/O device(s) 1208, a bus 1210 and a storage device 1212. The choice of processor is not critical as long as a suitable processor with sufficient speed is chosen. The memory 1204 is able to be any conventional computer memory known in the art. The storage device 1212 is able to include a hard drive, CDROM, CDRW, DVD, DVDRW, High Definition disc/drive, ultra-HD drive, flash memory card or any other storage device. The computing device 1200 is able to include one or more network interfaces 1202. An example of a network interface includes a network card connected to an Ethernet or other type of LAN. The I/O device(s) 1208 are able to include one or more of the following: keyboard, mouse, monitor, screen, printer, modem, touchscreen, button interface and other devices. Texture map generation using orthographic projections application(s) 1230 used to implement the texture map generation using orthographic projections implementation are likely to be stored in the storage device 1212 and memory 1204 and processed as applications are typically processed. More or fewer components shown in FIG. 12 are able to be included in the computing device 1200. In some embodiments, texture map generation using orthographic projections hardware 1220 is included. Although the computing device 1200 in FIG. 12 includes applications 1230 and hardware 1220 for the texture map generation using orthographic projections implementation, the texture map generation using orthographic projections method is able to be implemented on a computing device in hardware, firmware, software or any combination thereof. For example, in some embodiments, the texture map generation using orthographic projections applications 1230 are programmed in a memory and executed using a processor. In another example, in some embodiments, the texture map generation using orthographic projections hardware 1220 is programmed hardware logic including gates specifically designed to implement the texture map generation using orthographic projections method.

In some embodiments, the texture map generation using orthographic projections application(s) 1230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the texture map generation using orthographic projections method, a device acquires or receives 3D content (e.g., point cloud content). The texture map generation using orthographic projections method is able to be implemented with user assistance or automatically without user involvement.

In operation, the generation of a texture map using orthographic projections is performed in a fast and efficient manner. Nowadays, texture map generation relies in a complicated optimization to reduce mapping distortion and texture seams. However, such procedure is not suitable for real-time applications, and is usually performed on a frame-by-frame basis, meaning that it does not exploit the temporal correlation between texture maps. Described herein is a method to generate texture maps taking significantly less time and also allowing maps to exploit the correlation between content of different frames in time. The texture mapping is able to be used for automatic generation of volumetric content or is able to be used for more efficient compression of dynamic meshes.

Some Embodiments of Orthoatlas: Texture Map Generation for Dynamic Meshes Using Orthographic Projections 1. A method programmed in a non-transitory memory of a device comprising:
   generating patches from dynamic mesh information; and
   packing the patches on a texture atlas using orthographic projections.
2. The method of clause 1 wherein generating the patches from dynamic mesh information further comprises:
   generating a list of adjacent triangles;
   calculating triangle properties;
   adding neighboring triangles;
   checking for vertex occlusion; and
   checking for surface occlusion.
3. The method of clause 2 wherein generating the list of adjacent triangles comprises adding triangles that share a vertex with a triangle to the list.
4. The method of clause 2 wherein generating the list of adjacent triangles comprises adding triangles that share an edge with a triangle to the list.
5. The method of clause 2 wherein calculating the triangle properties comprises calculating a normal and a surface area of each triangle.
6. The method of clause 2 further comprising selecting a seed triangle whose normal is most aligned with a most frequent orientation that has not been added to a patch.
7. The method of clause 2 further comprising merging the patches based on a calculated cost, wherein the calculated cost is based on a perimeter of the patches and an ortho stretch value.

8. The method of clause 1 wherein packing the patches on the texture atlas using orthographic projections comprises implementing frame scaling, patch orientation and temporal stabilization.

9. An apparatus comprising:
a non-transitory memory for storing an application, the application for:
generating patches from dynamic mesh information; and
packing the patches on a texture atlas using orthographic projections; and
a processor coupled to the memory, the processor configured for processing the application.

10. The apparatus of clause 9 wherein generating the patches from dynamic mesh information further comprises:
generating a list of adjacent triangles;
calculating triangle properties;
adding neighboring triangles;
checking for vertex occlusion; and
checking for surface occlusion.

11. The apparatus of clause 10 wherein generating the list of adjacent triangles comprises adding triangles that share a vertex with a triangle to the list.

12. The apparatus of clause 10 wherein generating the list of adjacent triangles comprises adding triangles that share an edge with a triangle to the list.

13. The apparatus of clause 10 wherein calculating the triangle properties comprises calculating a normal and a surface area of each triangle.

14. The apparatus of clause 10 wherein the application is further configured for selecting a seed triangle whose normal is most aligned with a most frequent orientation that has not been added to a patch.

15. The apparatus of clause 10 wherein the application is further configured for merging the patches based on a calculated cost, wherein the calculated cost is based on a perimeter of the patches and an ortho stretch value.

16. The apparatus of clause 9 wherein packing the patches on the texture atlas using orthographic projections comprises implementing frame scaling, patch orientation and temporal stabilization.

17. A system comprising:
one or more cameras for acquiring three dimensional content; and
an encoder configured for:
generating patches from dynamic mesh information; and
packing the patches on a texture atlas using orthographic projections.

18. The system of clause 17 wherein generating the patches from dynamic mesh information further comprises:
generating a list of adjacent triangles;
calculating triangle properties;
adding neighboring triangles;
checking for vertex occlusion; and
checking for surface occlusion.

19. The system of clause 18 wherein generating the list of adjacent triangles comprises adding triangles that share a vertex with a triangle to the list.

20. The system of clause 18 wherein generating the list of adjacent triangles comprises adding triangles that share an edge with a triangle to the list.

21. The system of clause 18 wherein calculating the triangle properties comprises calculating a normal and a surface area of each triangle.

22. The system of clause 18 wherein the encoder is further configured for selecting a seed triangle whose normal is most aligned with a most frequent orientation that has not been added to a patch.

23. The system of clause 18 wherein the encoder is further configured for merging the patches based on a calculated cost, wherein the calculated cost is based on a perimeter of the patches and an ortho stretch value.

24. The system of clause 17 wherein packing the patches on the texture atlas using orthographic projections comprises implementing frame scaling, patch orientation and temporal stabilization.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
generating patches from dynamic mesh information; and
packing the patches on a texture atlas using orthographic projections;
wherein generating the patches from dynamic mesh information further comprises:
generating a list of adjacent triangles;
calculating triangle properties;
adding neighboring triangles, wherein a neighboring triangle is added to the list of adjacent triangles when a number of triangles in the list is less than a threshold and when an angle between a last inserted normal and a current normal is smaller than a second threshold, wherein adding neighboring triangles is controlled by a rate distortion cost that includes an orthographic stretch metric derived from the orthographic projections;
checking for vertex occlusion; and
checking for surface occlusion; and
merging the patches based on a calculated cost, wherein the calculated cost is based on a perimeter of the patches and an ortho stretch value.

2. The method of claim 1 wherein generating the list of adjacent triangles comprises adding triangles that share a vertex with a triangle to the list.

3. The method of claim 1 wherein generating the list of adjacent triangles comprises adding triangles that share an edge with a triangle to the list.

4. The method of claim 1 wherein calculating the triangle properties comprises calculating a normal and a surface area of each triangle.

5. The method of claim 1 further comprising selecting a seed triangle whose normal is most aligned with a most frequent orientation that has not been added to a patch.

6. The method of claim 1 wherein packing the patches on the texture atlas using orthographic projections comprises implementing frame scaling, patch orientation and temporal stabilization.

7. An apparatus comprising:
a non-transitory memory for storing an application, the application for:
generating patches from dynamic mesh information; and packing the patches on a texture atlas using orthographic projections;

wherein generating the patches from dynamic mesh information further comprises:

generating a list of adjacent triangles;

calculating triangle properties;

adding neighboring triangles, wherein a neighboring triangle is added to the list of adjacent triangles when a number of triangles in the list is less than a threshold and when an angle between a last inserted normal and a current normal is smaller than a second threshold, wherein adding neighboring triangles is controlled by a rate distortion cost that includes an orthographic stretch metric derived from the orthographic projections;

checking for vertex occlusion; and checking for surface occlusion; and merging the patches based on a calculated cost, wherein the calculated cost is based on a perimeter of the patches and an ortho stretch value; and a processor coupled to the memory, the processor configured for processing the application.

8. The apparatus of claim 7 wherein generating the list of adjacent triangles comprises adding triangles that share a vertex with a triangle to the list.

9. The apparatus of claim 7 wherein generating the list of adjacent triangles comprises adding triangles that share an edge with a triangle to the list.

10. The apparatus of claim 7 wherein calculating the triangle properties comprises calculating a normal and a surface area of each triangle.

11. The apparatus of claim 7 wherein the application is further configured for selecting a seed triangle whose normal is most aligned with a most frequent orientation that has not been added to a patch.

12. The apparatus of claim 7 wherein packing the patches on the texture atlas using orthographic projections comprises implementing frame scaling, patch orientation and temporal stabilization.

13. A system comprising:

one or more cameras for acquiring three dimensional content; and an encoder configured for:

generating patches from dynamic mesh information; and packing the patches on a texture atlas using orthographic projections;

wherein generating the patches from dynamic mesh information further comprises:

generating a list of adjacent triangles;

calculating triangle properties;

adding neighboring triangles, wherein a neighboring triangle is added to the list of adjacent triangles when a number of triangles in the list is less than a threshold and when an angle between a last inserted normal and a current normal is smaller than a second threshold and when an area of a patch is smaller than a fraction of a total area, wherein adding neighboring triangles is controlled by a rate distortion cost that includes an orthographic stretch metric derived from the orthographic projections;

checking for vertex occlusion; and checking for surface occlusion; and merging the patches based on a calculated cost, wherein the calculated cost is based on a perimeter of the patches and an ortho stretch value.

14. The system of claim 13 wherein generating the list of adjacent triangles comprises adding triangles that share a vertex with a triangle to the list.

15. The system of claim 13 wherein generating the list of adjacent triangles comprises adding triangles that share an edge with a triangle to the list.

16. The system of claim 13 wherein calculating the triangle properties comprises calculating a normal and a surface area of each triangle.

17. The system of claim 13 wherein the encoder is further configured for selecting a seed triangle whose normal is most aligned with a most frequent orientation that has not been added to a patch.

18. The system of claim 13 wherein packing the patches on the texture atlas using orthographic projections comprises implementing frame scaling, patch orientation and temporal stabilization.

* * * * *